United States Patent
Ellis (10) Patent No.: US 8,706,023 B2
(45) Date of Patent: Apr. 22, 2014

(54) MULTI-TUNER RADIO SYSTEMS AND METHODS

(75) Inventor: Michael D. Ellis, Boulder, CO (US)

(73) Assignee: 3D Radio LLC, Boulder, CO (US)

(*) Notice: Subject to any disclaimer, the term of this patent is extended or adjusted under 35 U.S.C. 154(b) by 352 days.

(21) Appl. No.: 12/348,765

(22) Filed: Jan. 5, 2009

(65) Prior Publication Data

US 2009/0221248 A1 Sep. 3, 2009

Related U.S. Application Data

(60) Provisional application No. 61/019,094, filed on Jan. 4, 2008.

(51) Int. Cl.
| | | |
|---|---|---|
| *H04H 20/71* | (2008.01) | |
| *H04B 1/18* | (2006.01) | |
| *H04H 60/27* | (2008.01) | |
| *H04H 60/35* | (2008.01) | |
| *H04H 60/74* | (2008.01) | |

(52) U.S. Cl.
CPC ............. *H04H 60/27* (2013.01); *H04H 60/35* (2013.01); *H04H 60/74* (2013.01)
USPC .................... 455/3.01; 455/185.1; 455/186.1; 455/132

(58) Field of Classification Search
CPC ........ H04H 60/27; H04H 60/35; H04H 60/74
USPC ................. 455/3.04, 3.05, 132, 160.1, 185.1, 455/186.1
See application file for complete search history.

(56) References Cited

U.S. PATENT DOCUMENTS

| | | | |
|---|---|---|---|
| 2,097,901 A | 11/1937 | Thomas | 455/172.1 |
| 4,109,115 A | 8/1978 | Yamamoto | 369/7 |
| 4,268,724 A | 5/1981 | Hubbard | 369/7 |
| 4,677,466 A | 6/1987 | Lert et al. | 725/22 |
| 4,682,370 A | 7/1987 | Matthews | 455/166 |
| 4,953,212 A | 8/1990 | Otsubo | 381/1 |
| 5,119,507 A | 6/1992 | Mankovitz | 455/154.1 |
| 5,187,589 A | 2/1993 | Kono et al. | 386/83 |
| 5,214,792 A | 5/1993 | Alwadish | 455/45 |
| 5,239,540 A | 8/1993 | Rovira et al. | 370/345 |
| 5,243,640 A * | 9/1993 | Hadley et al. | 455/426.1 |
| 5,253,066 A | 10/1993 | Vogel | 725/28 |

(Continued)

FOREIGN PATENT DOCUMENTS

| | | |
|---|---|---|
| GB | 2313 216 | 11/1997 |
| WO | WO 99 45700 | 9/1999 |

(Continued)

OTHER PUBLICATIONS

Louderback, "Improve Your Commute with Audio on Demand," ZDTV, 'Online! (Nov. 1999) (available at: http://www.zdnet.com/anchordesk/story/story_4066.html).

(Continued)

*Primary Examiner* — Duc M Nguyen
(74) *Attorney, Agent, or Firm* — Winston & Strawn LLP (57) ABSTRACT

A system, apparatus, method, and media directed to navigation in the field of digital radio systems are provided. For example, an apparatus, method, or medium can be implemented to provide a multi-tuner portable digital radio device that includes multiple modes and/or advances navigation tools.

12 Claims, 1 Drawing Sheet

(56) References Cited

U.S. PATENT DOCUMENTS

| | | | |
|---|---|---|---|
| 5,345,430 A | 9/1994 | Moe | 369/7 |
| 5,404,588 A * | 4/1995 | Henze | 455/186.1 |
| 5,406,558 A | 4/1995 | Rovira et al. | 370/326 |
| 5,448,534 A | 9/1995 | Okada | 369/7 |
| 5,457,815 A | 10/1995 | Morewitz, II | 455/161.1 |
| 5,463,599 A | 10/1995 | Yifrach et al. | 369/7 |
| 5,612,729 A | 3/1997 | Ellis et al. | 725/22 |
| 5,671,195 A | 9/1997 | Lee | 269/7 |
| 5,778,137 A | 7/1998 | Nielsen et al. | 386/68 |
| 5,818,441 A | 10/1998 | Throckmorton et al. | 715/717 |
| 5,867,794 A * | 2/1999 | Hayes et al. | 455/557 |
| 5,978,689 A | 11/1999 | Tuoriniemi et al. | 455/569.1 |
| 5,986,650 A | 11/1999 | Ellis et al. | 725/40 |
| 6,088,455 A | 7/2000 | Logan et al. | 380/200 |
| 6,134,426 A | 10/2000 | Volkel | 455/161.3 |
| 6,169,843 B1 | 1/2001 | Lenihan et al. | 386/46 |
| 6,233,389 B1 | 5/2001 | Barton et al. | 386/46 |
| 6,259,441 B1 | 7/2001 | Ahmad et al. | 345/720 |
| 6,275,268 B1 | 8/2001 | Ellis et al. | 348/564 |
| 6,327,418 B1 | 12/2001 | Barton | 386/46 |
| 6,356,704 B1 | 3/2002 | Callway et al. | 386/94 |
| 6,400,996 B1 | 6/2002 | Hoffberg et al. | 700/83 |
| 6,564,003 B2 | 5/2003 | Marko et al. | 386/69 |
| 6,588,015 B1 * | 7/2003 | Eyer et al. | 725/89 |
| 6,630,963 B1 | 10/2003 | Billmaier | 348/515 |
| 6,710,815 B1 | 3/2004 | Billmaier et al. | 348/515 |
| 6,721,236 B1 | 4/2004 | Eschke et al. | 369/6 |
| 6,725,002 B2 | 4/2004 | Sakurai et al. | 399/111 |
| 6,725,022 B1 | 4/2004 | Clayton et al. | 455/154.1 |
| 6,785,656 B2 | 8/2004 | Patsiokas et al. | 704/500 |
| 6,792,296 B1 * | 9/2004 | Van Bosch | 455/569.2 |
| 6,829,475 B1 | 12/2004 | Lee et al. | 455/419 |
| 6,850,252 B1 | 2/2005 | Hoffberg | 715/9 |
| 6,931,451 B1 | 8/2005 | Logan et al. | 709/231 |
| 6,944,430 B2 | 9/2005 | Berstis | 455/186.1 |
| 6,952,576 B2 | 10/2005 | Fish et al. | 455/414.1 |
| 6,961,585 B2 | 11/2005 | Minematsu | 455/556.1 |
| 7,028,323 B2 | 4/2006 | Franken et al. | 725/9 |
| 7,065,342 B1 | 6/2006 | Rolf | 455/412.1 |
| 7,095,688 B2 | 8/2006 | Kondo et al. | 369/47.33 |
| 7,313,375 B2 * | 12/2007 | Lee et al. | 455/186.1 |
| 7,418,277 B2 * | 8/2008 | Tsai | 455/569.2 |
| 7,668,576 B2 * | 2/2010 | Ellenbogen et al. | 455/575.1 |
| 2001/0047379 A1 | 11/2001 | Jun et al. | 709/1 |
| 2002/0045438 A1 | 4/2002 | Tagawa et al. | 455/412 |
| 2002/0057380 A1 | 5/2002 | Matey | 348/731 |
| 2002/0174430 A1 | 11/2002 | Ellis et al. | 725/46 |
| 2002/0186957 A1 | 12/2002 | Yuen | 386/46 |
| 2003/0013425 A1 * | 1/2003 | Nee | 455/186.1 |
| 2003/0095791 A1 | 5/2003 | Barton et al. | 386/83 |
| 2003/0163823 A1 * | 8/2003 | Logan et al. | 725/89 |
| 2003/0208771 A1 | 11/2003 | Hensgen et al. | 725/100 |
| 2004/0029541 A1 * | 2/2004 | Baranowski et al. | 455/130 |
| 2004/0128692 A1 * | 7/2004 | Wolfe et al. | 725/89 |
| 2005/0005298 A1 | 1/2005 | Tranchina | 725/81 |
| 2005/0014495 A1 | 1/2005 | Shanahan | 455/419 |
| 2005/0020223 A1 | 1/2005 | Ellis et al. | 455/186.1 |
| 2005/0064835 A1 * | 3/2005 | Gusler et al. | 455/245.1 |
| 2005/0229213 A1 | 10/2005 | Ellis et al. | 725/58 |
| 2006/0026637 A1 | 2/2006 | Gatto et al. | 725/37 |
| 2008/0045170 A1 * | 2/2008 | Howley et al. | 455/186.1 |
| 2008/0204604 A1 * | 8/2008 | Campbell | 348/731 |
| 2008/0320523 A1 * | 12/2008 | Morris et al. | 725/47 |
| 2010/0120366 A1 * | 5/2010 | DeBiasio et al. | 455/41.3 |

FOREIGN PATENT DOCUMENTS

| | | |
|---|---|---|
| WO | WO 99 45701 | 9/1999 |
| WO | WO 99 66725 | 12/1999 |
| WO | WO 00 13416 | 3/2000 |
| WO | WO 00 16548 | 3/2000 |
| WO | WO 00 13415 | 6/2000 |
| WO | WO 00 45511 | 8/2000 |
| WO | WO 01 76248 | 10/2001 |

OTHER PUBLICATIONS

International Search Report, application No. PCT/US02/05039, mailed Feb. 4, 2003.

* cited by examiner

MULTI-TUNER RADIO SYSTEMS AND METHODS

CROSS-REFERENCE TO RELATED APPLICATIONS

This application claims the benefit of U.S. Provisional Patent Application No. 61/019,094 filed Jan. 4, 2008 entitled "Multi Tuner Radio Device" which is incorporated in its entirety by reference as if fully set forth herein.

This application is related to multi-tuner radio systems and methods such as those described in U.S. Pat. No. 7,171,174, U.S. Pat. No. 7,343,141, U.S. patent application Ser. No. 12/033,616, and U.S. patent application Ser. No. 11/609,512, which are hereby explicitly incorporated by reference herein in their entirety such as with respect to specific implementations of such systems and methods.

BACKGROUND

Systems and methods of the invention are directed in general to digital radio systems, and more specifically related to multi-tuner digital radio systems such as radio navigation systems.

Advanced features and tools are needed in the field of digital radios to enhance the user experience and to advance the technology. Tools and features that can increase the radio device's usability and "stickiness" are generally desired. Existing known systems are deficient in providing sufficient features such as in the field of navigation.

BRIEF DESCRIPTION OF THE DRAWINGS

Features of embodiments of the invention, its nature, and various advantages will be apparent from the following detailed description, taken in conjunction with the accompanying drawings in which.

DETAILED DESCRIPTION OF THE PREFERRED EMBODIMENTS

Figure 1:
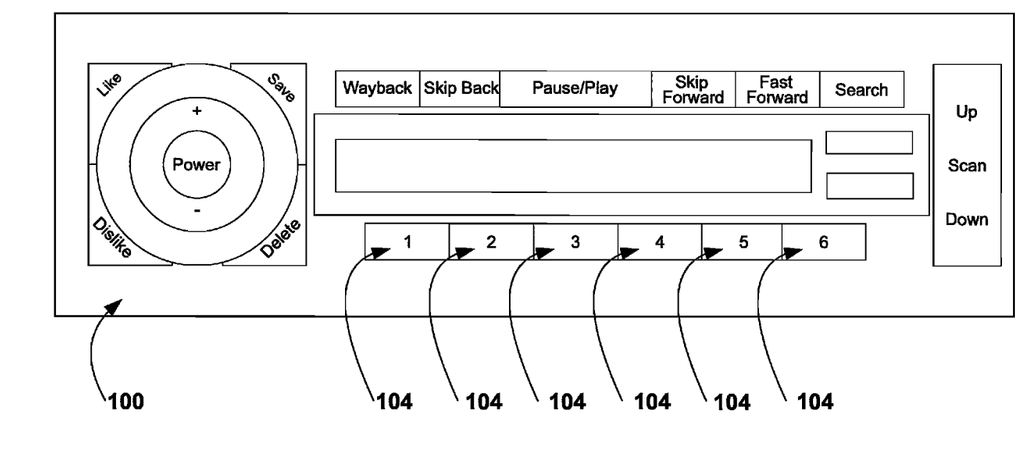
FIG. 1 illustrates a faceplate of a radio system in accordance with an embodiment of the invention.

FIG. 1 illustrates the faceplate of a 3D Radio aftermarket car stereo system. This is an illustrative implementation, and other implementations are possible within the spirit of this invention. The look and feel may be altered, the names of the buttons may be changed, buttons may be added or removed, and other suitable alterations may be made. In addition, similar features may be used in products designed for other environments, such as home audio systems and portable music devices.

With further reference to FIG. 1, the illustrated 3D Radio device supports six preset radio stations, generally designated by reference numeral 104. In one embodiment, user can set the radio stations to his/her favorite radio channels. Preferably, a plurality of preset radio stations can be supported. Radio system 100 can support at least six radio tuners, with one tuner devoted to each preset station. In one embodiment, radio system 100 may include eight radio tuners, one radio tuner corresponding to each of the 6 preset radio stations, one radio tuner to allow a station other than one of the favorite radio stations to be received at the same time as all of the presets, and one spare radio tuner to keep track of the most recently tuned station in order to allow continuous reception of that particular station.

The radio tuners can received radio signals using a plurality of supported technology. These may include AM, FM, HD, satellite, or Internet (e.g., using Wi-Fi).

The device 100 can include adequate memory to buffer a predetermined amount of digitized and compressed audio for the received stations. For example, to be able to buffer one hour of audio from each of the eight stations, the device may include one-half gigabyte of internal memory. The device may include additional memory. For example, the device may include a total of one gigabyte of internal memory to allow one hour of storage per station plus an additional eight hours of storage for saved songs and other audio content. Memory may include memory chips or cartridges, (e.g., RAM, dynamic RAM, static RAM, programmable read-only memory (PROM), erasable programmable read-only memory (EPROM), flash memory, and other memory chips or cartridges), and any other medium to which a computer can write and from which a computer can read (such as a disk drive or memory stick).

The device can include one or more processors, such as digital signal processors, and other circuits to compress the received audio information digitally and store it into the memory. The audio data may be stored, for example, in the MP3 format. The processor can perform other tasks, such as controlling the audio output of the device and managing the user inputs and outputs.

In the present embodiment, the 3D Radio device 100 can continuously receive, compress, and store audio data from the eight tuners (e.g., each of the tuners) (six presets, current station, and previous station) into the memory device. The processor can continue to monitor the status of the memory device. When an hour of audio programming is available from any stored audio data, the oldest audio data may be overwritten, so that the most recent radio programming from the station is always available for listening.

The 3D Radio may support connections to several external devices, for example:
  Music CD, CD ROM or DVD
  Flash drive over the USB port
  Flash memory SD-CARD device
  Mobile phone using Bluetooth or other wireless connection In accordance with one or more embodiments, a radio device able to receive multiple radio stations simultaneously (which is sometimes referred to herein as 3D Radio device) having different operational modes can be provided as illustrated by the examples below. The 3D Radio device may be in any of several operational modes. For example:
  Off. This is when the device is turned off, e.g., with the power button, or when the car has been turned off. All tuners continue to receive radio programming and the device continues to compress and store the received audio in its memory, but the display is turned off and the audio output ceases.
  On, normal radio play. When the device is turned on, the 3D Radio outputs audio from one of the radio stations. To play back, the audio is retrieved from memory, decompressed, converted to analog, and output. The audio may be played back immediately after it is compressed and stored, or it may be delayed by any amount of time up to the size of the audio memory buffer. In the example shown, the playback point may be at real time or may be delayed by any amount up to an hour.
  On, radio paused. When the radio output is paused, the audio output is muted, and the storage of new audio data continues.

Saving radio. While playing radio or while 3D Radio is paused, the incoming audio data may be stored to a more permanent memory location, so that it will not be overwritten as the buffer fills. The radio station selected for output may be in saving mode, and one or more of the other stations not currently selected may also be in saving mode.

Saved content playback. In this mode, audio continues to be stored from all tuners. However, the output audio is taken from a stored audio file rather than from one of the radio content buffers. This stored content may be something that was previously received as radio programming, it may be something stored on a connected device such as a CD or flash memory card, or it may be any item of audio content that has been transferred from such a device to internal memory.

Playback of stored content paused. In this mode, audio playback from a stored content item has been temporarily stopped. Preferably, the content is retrieved from the internal memory of the device 100. Alternatively, it may have been retrieved from a connected device.

Phone. In the phone mode, the 3D Radio's microphone and speakers are used to support a phone call on a connected device (such as a Bluetooth mobile phone). Storage of audio data from all tuners continues, but playback has been paused.

Overlay. During any of these modes, a user feature may be initiated that requires using the display and buttons, but allows the audio to continue. In these cases, storage of radio programming continues on all stations, and playback of radio or stored content continues as begun prior to the overlay.

Each of the unselected radio station presets is in one of three modes:

Disabled. Before the user has programmed a preset, the associated tuner is disabled and no content is stored.

Normal. The playback point progresses along with the record point. The delay between the two remains the same as it was when the station was last selected for output.

Paused. The playback point does not progress. The delay between the playback point and the record point increases as additional content is buffered.

In accordance with one or more embodiments, a display can be provided as illustrated by the examples below. For example, a three-line LCD display, as shown, allows a variety of information to be presented to the user, depending on the mode. In general, the first line of the display contains information about the mode and source, while the second and third line contain more specific information about an item of audio content being played. For example:

In off mode, the display is blank.

When playing radio:
  Line 1 includes:
    The station preset number
    The station frequency (if appropriate for the type of source) or channel number
    The station call letters or name
    A play icon to indicate play mode
    A count of the time delay between the playback point and the record point for this station, in mm:ss format. This count does not change while playing back radio
    If in save mode, the save icon is also displayed
  Line 2 includes:
    A thumbs-up icon if the artist of the item currently being played back has been designated as a favorite
    A thumbs-down icon if the artist has been designated as a dislike
    The name of the artist (if available)
    May be the category of item (such as traffic, news, etc.)
    May be the name of a radio show
    For a commercial, may include the first of two lines of information about the product or service
  Line 3 includes:
    A thumbs-up icon if the item currently being played back has been designated as a favorite
    A thumbs-down icon if the item has been designated as a dislike
    The name of the item, or the second line of the name (if available)
    For a commercial, may be the second line of information about the product or service
    May present a call to action, such as "Press the phone button to buy tickets"

When radio is paused, the display is the same, except:
  The pause icon is displayed instead of the play icon
  The playback delay count increments every second When playing back a saved item, the display is similar to the playback of radio programming, except:
  The information about the radio station (present, frequency, station name) is replaced with information about the source (saved, CD, USB, etc.)
  Time displayed is the playback offset from the start of the item, and increments every second When playback of a stored item is paused, the display is the same except:
  The pause icon is displayed instead of play
  The playback offset does not change In phone mode, the display shows:
  Line 1 is phone icon and the phone number
  Line 2 is the caller ID information, if available
  Line 3 may show the connect time (minutes and seconds)

When in overlay mode, the display contents depend on the feature

In accordance with one or more embodiments, mode and display changes can be provided as illustrated by the examples below. The following events can cause mode and display changes:

If a content item ends during normal radio play, the display is updated with any new information and normal play continues.

While in the radio pause mode, if the delay between the playback point and the record point reaches the size of the buffer, the 3D Radio resumes normal radio play mode, updating the display and commencing audio output at the maximum delay position.

If an unselected preset is in pause mode and reaches its maximum delay, the preset returns to normal mode, and the delay value for that station is set to zero.

If an unselected preset has a non-zero delay and it remains unselected for a time exceeding the size of the buffer, the delay is reset to zero.

If the playback of a saved item reaches the end of that item, the 3D Radio checks to see if there is another item stored in the same location, and begins playback of the next sequential item. After reaching the end of the last item in the location, the 3D Radio enters pause mode on playback of that item.

If information about a call-in opportunity is received in the radio signal while in normal radio mode and the playback delay is less than 30 seconds, the call-in information is displayed and will be used if the user presses the phone button.

If a phone call ends (either because the user hangs up or because the call was disconnected from the other end), the 3D Radio resumes the playback of the radio station or saved item that was interrupted by the call, using the playback point at the time of the commencement of the call.

If a content item ends (in the record stream) while in save mode, the 3D Radio completes writing the item to memory, and removes the save icon from the display. Playback continues without interruption.

In accordance with one or more embodiments, certain interactivity can be provided as illustrated by the examples below. The 3D Radio can respond to button presses, for example, as follows:

Power.
- If the device is off, turn on. Return to the most recent pause or play mode, either for the most recently selected radio station or for the most recently interrupted playback of a saved content item. Enable audio output and update the display appropriately.
- If the device is on, turn it off. Blank the display and disable the audio output. If in phone mode, exit. If in overlay mode, exit. Remember the current radio or saved content play/pause mode and delay or playback offset.
- While in off mode, all buttons other than the power button may be ignored.

Volume Up or Volume Down. Adjust the volume. This option is not active while audio is paused. The device may maintain separate volume levels for radio play, saved item playback (if desired, with different levels for playback from different sources), and phone. The volume level may be briefly displayed on line 3 of the display, temporarily replacing any other text.

Play/pause.
- If in play mode for radio or saved content, enter pause mode. If in pause mode enter play mode. Turn off/on audio and update the display.
- If in save mode, toggles between pause and play, but does not affect saving of content item.
- This button is ignored in phone mode.
- If in overlay mode, operation of this button depends on the specific function:
  - If in the search feature, the current playback of radio or any saved content item is paused, the search feature is exited, and playback of the selected item commences at its beginning. The display is updated to reflect playback of the selected saved or radio item.
  - If the play/pause button is pressed while other features are used in overlay mode, the current playback of radio or saved content pauses or resumes without updating the display.

Number keys (1-6):
- Six keys are shown in this example, but any suitable number of presets may be supported.
- While listening to radio, pressing and holding a number key for at least two seconds programs the button for the currently tuned station. The tuner associated with the specific preset is programmed to receive the station. Any buffered audio data stored for the station may be copied into buffer memory associated with the preset. Storing of audio data for the station into that buffer begins. In some implementations, tuners are not preassigned to preset numbers, but rather are assigned when the user programs the preset. In these implementations, the tuner may not need to be reprogrammed and the audio data may not need to be copied.
- Pressing a number key briefly will enter radio mode (if not already in radio mode), and either resume playback or pause state for the selected station. In some implementations, selecting a station that is paused will cause it to enter play mode at the previous delay offset. The display and audio output will be set as appropriate. If one of these buttons is pressed while in playback mode for a saved content item, that item may be paused, so that playback of that item can be resumed at the same point at a later time. This does not affect save mode.
- If in phone mode, these buttons may be ignored, or the number may be used to access telephone features.
- If in overlay mode, the function of these keys may depend on the specific feature:
  - In the search feature, pressing a number key may change the search category to show content items in the buffer for the indicated radio station, and select the most recent content item in that buffer for display.

Way Back:
- In radio mode (pause or playback), sets the playback delay to the size of the buffer for the currently selected station and enters play mode. The display and audio output are updated appropriately.
- Does not affect save mode.
- In playback or pause mode for a saved item, restarts playback of the selected content item.
- Ignored in phone mode.
- For overlay modes:
  - In search, updates the display to the earliest or first content item in the selected search category.

Now:
- In radio mode (pause or playback), sets the playback delay to zero for the currently selected station and enters play mode. The display and audio output are updated appropriately.
- Does not affect save mode.
- In playback or pause mode for a saved item, this button is ignored.
- Ignored in phone mode.
- For overlay modes:
  - In search, updates the display to the latest or last content item in the selected search category.

Instant Replay:
- In radio pause mode, enters play mode and performs instant replay function.
- In radio play mode, skip back to the start of the song or commercial, if one is currently being played and its start can be identified (if less than one second from start of item, skip back to start of previous item). If not a song or commercial, skip back 15 seconds. Skip back to start of buffer if there is less that 15 seconds available. Does not affect save mode. Start playback at the new offset.
- In recorded item playback or pause mode, skip back playback point by 15 seconds (or to start of item if less than 15 seconds from start) and start playback mode from that point.
- Ignored in phone mode.
- In overlay mode:
  - Search:
    - Selects previous item in search category and updates display.

Skip Forward:
- In radio pause mode, enters play mode and performs skip forward function.
- In radio play mode, skip to the end of the song or commercial, if one is currently being played and its end can be identified. If not a song or commercial, skip forward by 30 seconds. Set delay to zero if it is less than 30 seconds. Does not affect save mode. Start playback at the new offset.
- In recorded item playback or pause mode, skip forward of playback point by 30 seconds and start playback mode from that point. Ignored if less than 30 seconds from end of item.
- Ignored in phone mode.
- In overlay mode:
  - Search:
    - Selects next item in search category and updates display.

Save:
- If in radio play or pause mode, and the current playback point is in a song, show, or other content item that has already ended broadcast (playback delay is greater than the length of the item), copy the entire item from the station buffer to permanent storage and add title/track information, along with information about station and broadcast time.
- If the item is still in progress, copy the portion of the item that has completed and enter save mode.
- If in saved item playback mode or pause mode for an item in internal memory, this button is ignored unless a flash memory device is attached, in which case the item is copied to that device.
- If in playback or pause mode for an item on CD or external flash memory device, copy the item to local memory and store whatever information is available.
- Ignored in phone mode. In some implementations, 3D Radio may save a recording of the phone conversation to internal memory.
- If in search feature:
  - If currently displayed title is in a radio station buffer, copy the item (if complete), or copy the portion that is complete and enter save mode for that station.
  - If currently displayed title is on CD or flash memory, copy it to internal memory.
  - If currently displayed title is in internal memory, copy the item to flash memory if attached, or ignore this key if no external memory device is available.

Delete:
- Ignored if not in play/pause mode for a saved item in internal memory or search mode with such an item displayed. Deletes the indicated item from internal memory. In search mode, displays next item in category list, or top of next category list if category list becomes empty. If pressed while playing back or paused for a saved content item, enters pause mode once item has been deleted.

Search:
- Ignored in phone mode.
- If in pause or play mode for radio or saved item, enters search mode. Playback remains the same, but display enters overlay mode with search data. First non-empty search category from the following list is displayed:
  - Saved—all saved content items in internal memory, sorted by date/time saved. First line of display: Search icon, save icon, followed by text "Saved content".
  - Favorites—all content items marked as favorites, whether available in radio station buffers or saved content memory. Sorted by start time for content on radio stations, followed by saved content sorted by date/time saved. First line of display: Search icon, favorite icon, followed by text "Favorites".
  - 1-6—One category for each preset. Includes all content available in the station's buffer, sorted by broadcast time (item currently being broadcast is first, next most recent is second, etc.) First line of display: Search icon, present number, station frequency or channel number, and station name/call letters.
  - One category for each currently available external memory device (CD, USB flash drive, SD memory device), with items sorted as stored on the device. Track names displayed if available. First line of display: Search icon, the name of the device (e.g., "CD"), and the name of the album if available.
  - Additional specific categories may be available, such as "Traffic" or "Weather", in which case all content with a matching category in any radio station buffer is included, sorted newest to oldest. First line: Search icon, followed by name of category.
  - Other categories may be created dynamically based on availability. For example, if several songs by the same artist or from the same album have been stored, they may be grouped under a search category with that name.
- Display is configured as follows:
  - Line one is the Search icon, followed by the specific name and/or icon associated with the category.
  - Lines two and three are the specific information related to the content item (e.g., artist and track name).
- If Search button is pressed while in search feature, the next non-empty search category is selected, the first item in that category is found, and the display is updated.
- If the last Search category is already displayed when the Search button is pressed, the Search feature is exited and the display is updated based on the underlying play or pause mode.
- Search mode times out if there is no user input within two minutes.

Thumbs Up:
- In pause or play mode for radio or a saved item, or while in search mode, toggles the favorite status for the selected item. If already thumbs up, in some implementations this may toggle the favorite setting to remove the thumbs-up icon for the item, while in other implementations the thumbs up button may be ignored if selected for an item that has already been marked as favorite. If marked as thumbs down, changes it to thumbs up. If neither, set it to thumbs up. Updates the display. Stores the new setting in memory so that matching content will be recognized as a favorite when it is seen later. In some implementations, multiple levels of preference may be specified, for example, zero to four thumbs up.
- Ignored in phone mode. In some implementations, may add the phone number to a phone book.

Thumbs Down:
- In pause or play mode for radio or a saved item, or while in search mode, toggles the dislike status for the selected item. If already thumbs down, in some implementations this may toggle the dislike setting to remove the thumbs-down icon for the item, while in other implementations the thumbs down button may be ignored if selected for an item that has already been marked as disliked. If marked as thumbs up, changes it to thumbs down. If neither, set it to thumbs down. Updates the display. Stores the new setting in memory so that matching content will be recognized as a dislike when it is seen later. In some implementations, multiple levels of dislike may be specified, for example, zero to four thumbs down.

Ignored in phone mode.

Phone:
  If in radio or saved content play mode, pauses the playback
  If there is an incoming call, answers the call
    Caller ID should already be displayed
    Connect time can also be displayed for the duration of the call
  If the currently playing audio has embedded phone information, initiates a call to the indicated phone number.
    Shows caller ID and associated information on display
    Shows string "Dialing" until there is an answer, and then display connect time.
    May include an automatic redial number for busy signal
  If there is no phone number in the radio signal, allow the user to specify the number or phone book entry
    Supports voice recognition and dialing
    Allows use of phone keyboard
    Some implementations of 3D Radio may include all digits 0-9, and the 3D Radio buttons can be used to dial
    Display is updated while dialing and during call
  During a call:
  Hangs up the call
  Resumes playback mode for radio or saved content most recently selected Source:
  Selects the spare (e.g., seventh) tuner if not already selected
  Displays and selects one of the available audio sources. Pressing this button multiple times will toggle through the available sources. The first press does not change sources, just displays the name of the currently selected source.
  If on the last source, cycles back to the first.
  Clears the audio buffer for the station each time the source changes.
  Supported sources may include:
    AM
    FM
    HD
    Satellite
    Internet
    Saved
    CD (only shown if a CD is inserted)
    a Flash (only shown if a flash memory device is connected)
  Selecting Saved, CD, or Flash does not require selecting and changing the tuner or clearing the audio buffer. Instead, it enters saved content playback mode for that device.
  Display of source name times out after five seconds, or when the user presses any other button.

Tune Up/Down:
  Selects the spare (e.g., seventh) tuner if not already selected
  Adjusts the frequency if appropriate for the type of source (e.g., AM or FM radio).
  Increments the channel number if appropriate for the type of source (e.g., Internet or Satellite radio).
  Displays the frequency or channel number and the channel name if available.
  If on the highest (lowest) frequency/channel, cycles to lowest/highest.
  Clears the audio buffer for the station each time the frequency/channel changes.
  Tuning up and down while the Saved, CD, or Flash source is selected jumps between tracks stored on that source (does not affect a tuner or clear any buffer).
  While in the search feature, these buttons may be used to select the next/previous content item in the selected category.

Scan:
  Enters or exits scan mode
  During scan mode, the word "Scan" is added to the first line of the display.
  Upon entering scan mode, all tuners are allocated to the scan feature
  Each is tuned to the next consecutive available station on the currently selected source. For example, eight tuners are tuned to the eight stations on the selected source at the lowest frequencies. The first is selected for output.
  Every five seconds, the next tuner is selected and the one just deselected is tuned to the next available source. In some implementations, the tuner reassigned may be the one prior to the one just deselected, to allow the user to go back to that station and maintain its audio buffer.
  When the user exits scan mode, there will be, for example, 40 seconds of stored audio available to skip back and listen to.
  Pressing the Play/pause button while scan is active pauses or resumes the scan (not the audio) and allows the user to listen to the current selection for longer. Scan pause mode may time out automatically to normal radio play mode if the user does not resume scan within one minute.
  Skip Forward while scan is active immediately advances the scan to the next station.
  Instant Replay while scan is active returns to the previous station in the scan, and puts the scan (but not the audio) into pause mode.

3DR:
  Allows the user to enable the "My 3DR" feature.
  Personalized "radio station"
  The text "My 3DR" is pre-pended to the first line of the display, along with information about the source of the content being played.
  Content is automatically selected from all available content sources. As each item ends, the next item is automatically selected and played, regardless of source.
  Radio content from all active presets is used, based on previous user Favorite selections
  Preference is given to older content that will be overwritten sooner
  Saved content is also used, on a "shuffle" basis
  May be filled with radio content that is similar to that marked as favorites (e.g., same artist, link via a "similar to" database)

May be further extended by content that has not been marked either favorite or dislike All audio navigation features (Way Back, Instant Replay, Skip Forward, Now, Play/pause) are available while in the My 3DR feature.

Audio (not shown):

Enters overlay mode to allow the user to adjust various audio settings, while continuing to play radio or saved content. Pressing the Audio button multiple times may toggle between different adjustment features, such as bass, treble, balance, selecting equalizer settings, etc. While in the audio adjust feature, the other buttons may be repurposed. The Volume Up/Down or Tune Up/Down buttons may be used to increase and decrease various settings dynamically. The number keys may be used, for example, to select from multiple equalizer presets. The display is used to guide the user through the settings. Pressing the Audio button while the final audio setting is displayed may exit the audio adjustment feature. The overlay mode display times out if there is no user input for one minute.

Previous Station (not shown):

Pressing this button will enter radio mode (if not already in radio mode), and either resume playback or pause state for the most recently tuned station. This may involve selecting one of the six preset tuners, or it may involve selecting the spare tuner if the most recent station isn't a preset. If possible, this function is always performed by selecting a previously tuned tuner rather than by changing a tuner setting, to allow the user the option of reviewing past audio on the station. The display and audio output will be set as appropriate. If in playback mode for a saved content item, that item may be paused, so that playback of that item can be resumed at the same point at a later time. This does not affect save mode. In some implementations, pressing the Previous button may allow the user to resume playback of a previously played saved item.

If in phone mode, this button may be ignored.

If in overlay mode, the function of this key may depend on the specific feature.

Setup/Menu (not shown):

Enters overlay mode and allows access to various device setup and configuration options. While in the setup, other keys such as the number keys and navigation keys may perform alternate functions, and the display may be used to guide the user through various operations. Pressing this key again may exit from the setup feature. Audio playback may continue normally while in the setup feature. If the user presses no keys for one minute while in the settings feature, overlay mode and the feature may time out.

Rewind, Fast Forward, Slow Play (not shown):

Change the playback direction and/or speed of the current radio or saved content playback.

May include frequency compensation

Includes the same rules about coming to the start or end of the content as during normal play and skip functions In accordance with one or more embodiments, certain external memory device related features can be provided as illustrated by the following examples. When an external memory device is connected, the 3D Radio may take any suitable action:

When a music CD is inserted, or a flash memory device is attached that contains music:

3D Radio may begin playing the music automatically.

The music tracks may be automatically stored into internal memory if adequate space is available. In the case of a music CD, the format of the music may be changed (e.g., to MP3). Any associated information (e.g., artist and title) may be copied as well or retrieved from another location.

The user may be given an option to save the music to internal memory.

The music tracks may be made available to the user for searching, saving, and playing directly from the device.

When a memory device with music information (artist, title, song signature, etc.) is connected:

The information may be automatically copied into internal memory.

The information may be made available for stored or broadcast music.

The user may be given an option to save the data to internal memory.

When a memory device with a 3D Radio software update is attached:

The update may be automatically installed.

The user may be given an on-screen option to install the update.

While an external writeable memory device (e.g., flash drive) is attached:

When saving a content item, the user may be given the option to save the item to the external memory rather than internal memory The user may be given the option to store all user settings to the external memory device, and to load user settings from the external memory device if present Note in the above when mentioned is made to ignoring, it will be understood that the respective feature can be implemented without such ignoring if desired depending on the context of the usage of the term.

It is to be understood that other embodiments can be utilized and structural changes can be made without departing from the scope of the invention.

The terms radio device, system, mobile device, etc. can be used interchangeably unless the context indicates otherwise to those of ordinary skill in the art.

It should be appreciated that the embodiments therein can be implemented in numerous ways, including as a method, a circuit, a system or a device. For example, processes illustratively described herein can be implemented on computer or processor readable medium such as RAM, CD, DVD, hard drive, or other medium (in one or more locations) that can be executed or processed by a processor or computer to perform the processes.

While the systems and methods described herein have been shown and described with reference to the illustrated embodiments, those of ordinary skill in the art will recognize or be able to ascertain many equivalents to the embodiments described herein by using no more than routine experimentation. Such equivalents are encompassed by the scope of the present disclosure and the appended claims. Accordingly, the systems and methods described herein are not to be limited to the embodiments described herein.

What is claimed is:

1. A portable multi-tuner digital radio device that processes multiple radio signals simultaneously and receives associated data for audio items carried by the radio signals, comprising options implemented on the device that provide a user of the device with the opportunity to select to enter the device into different operation modes including:

off mode wherein one or more tuners each continues to receive radio programming and the device continues to compress and store the received audio in its memory when the device is turned off, wherein the memory comprises a buffer configured to include adequate memory to buffer a predetermined duration of digitized and compressed audio content received from each of a plurality of the multiple tuners for later playback;

radio paused mode wherein the device is in an on mode and radio output is paused, saving mode wherein during radio play incoming audio data is stored at a more permanent memory location; and overlay mode wherein during one or more of the modes, a user feature is initiated that requires a use of a display or buttons of the device or buttons without affecting a current mode, wherein storage of radio programming received by all tuners continues, and playback of radio or stored content continues as begun prior to initiating the overlay mode, wherein at least one of the user features permits the user to indicate a favorite status for a first audio item and, the device is configured to use the associated data comprising artist or title of the first audio item and find other previously received audio items in the buffer where the buffered audio item has matching content, whereby the device finds other similar audio items in the buffer for the user for playback on the device, wherein the device includes a phone mode, wherein while the device is in the phone mode, playback of radio or stored content is paused while radio play incoming audio data continues to be stored and while the device is no longer in phone mode, the device resumes playback of radio or stored content.

2. The device of claim 1 wherein the overlay device is operable during all modes and permits the user to interact with the display or buttons of the device without interrupting or changing the current mode.

3. The device of claim 1 wherein the device is a car radio.

4. The device of claim 1 wherein the device is an aftermarket car radio.

5. The device of claim 1 wherein the device includes a normal play mode.

6. The device of claim 1 wherein the device includes a saved content playback mode wherein output audio is taken from a stored audio file rather than from the radio content buffer.

7. The device of claim 1 wherein the memory is configured to simultaneously store in the buffer at least an audio portion of every radio signal received for later output by selection of the user.

8. The device of claim 1 wherein the device is configured to create and playback a personalized radio station using audio items similar to marked favorites, wherein the audio items are obtained from one or more sources including the buffer.

9. A portable multi-tuner digital radio device that processes multiple radio signals simultaneously and receives associated data for audio items carried by the radio signals, comprising options implemented on the device that provide a user of the device with the opportunity to select to enter the device into different operation modes including:

an off mode wherein one or more tuners each continues to receive radio programming and the device continues to compress and store the received audio in its memory when the device is turned off, wherein the tuners include one or more tuners corresponding to pre-set radio stations as selected by a user and at least one tuner corresponding to a radio station other than the pre-set radio stations, wherein the device allows the radio station other than the pre-set stations to be received at the same time as all of the pre-set stations, wherein the memory comprises a buffer configured to include adequate memory to buffer a predetermined duration of digitized and compressed audio content received from each of a plurality of the multiple tuners for later playback;

a radio paused mode wherein the device is in an on mode and radio output is paused;

a saving mode wherein during radio play incoming audio data is stored at a more permanent memory location; and an overlay mode wherein during one or more of the modes, a user feature is initiated that requires a use of a display or buttons of the device or buttons without affecting a current mode, wherein storage of radio programming received by all tuners continues and playback of radio or stored content continues as begun prior to the overlay, wherein at least one of the user features permits the user to indicate a favorite status for a first audio item and the device is configured to use the associated data comprises artist or title of the first audio item and find other previously received audio items in the buffer where the previously received audio item has matching content that is received by the device, whereby the device finds other similar audio items in the buffer for the user for playback on the device, wherein the device includes a phone mode, wherein while the device is in the phone mode, playback of radio or stored content is paused while radio play incoming audio data continues to be stored and while the device is no longer in phone mode, the device resumes playback of radio or stored content.

10. The device of claim 9 further including at least one spare tuner corresponding to a recently tuned station wherein the device allows the one spare tuner to keep track of the most recently tuned station in order to allow continuous reception thereof.

11. The device of claim 10 wherein the memory is configured to buffer and simultaneously store in a buffer at least an audio portion of every radio signal received for later output by selection of the user.

12. The device of claim 9 wherein the device is configured to create and playback a personalized radio station using audio items similar to marked favorites, wherein the audio items are obtained from one or more sources including the buffer.

* * * * *

UNITED STATES PATENT AND TRADEMARK OFFICE
CERTIFICATE OF CORRECTION

| | | |
|---|---|---|
| PATENT NO. | : 8,706,023 B2 | Page 1 of 1 |
| APPLICATION NO. | : 12/348765 | |
| DATED | : April 22, 2014 | |
| INVENTOR(S) | : Michael D. Ellis | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 471 days.

Signed and Sealed this
Eighteenth Day of August, 2015

Michelle K. Lee
*Director of the United States Patent and Trademark Office*